June 23, 1931.  R. L. LEE  1,810,971
ADJUSTABLE CASTER
Filed Aug. 6, 1923
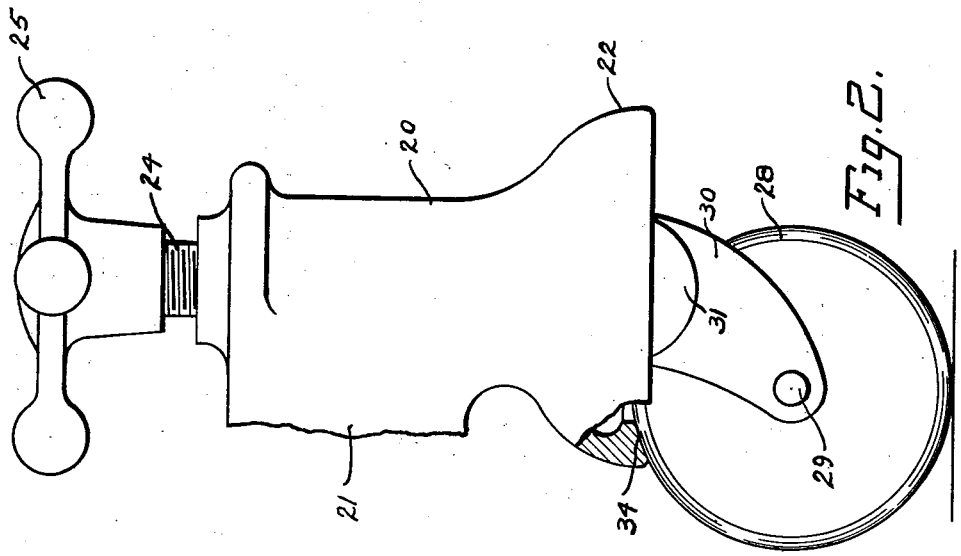
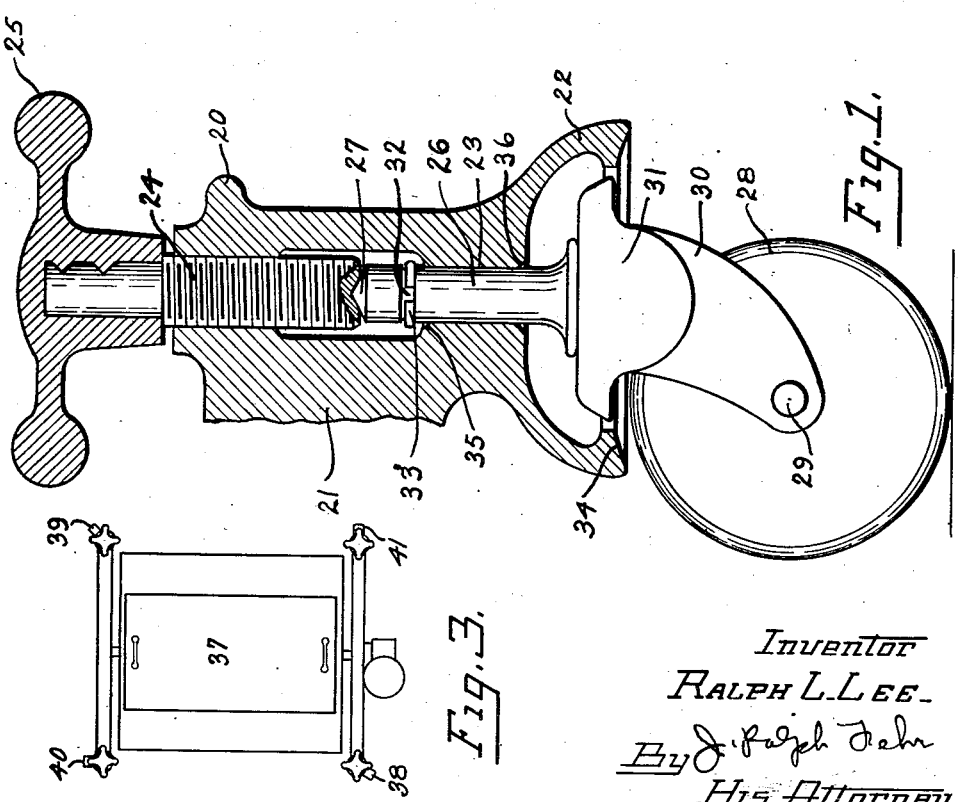
Inventor
Ralph L. Lee
By J. Ralph Fehr
His Attorney Patented June 23, 1931

1,810,971

UNITED STATES PATENT OFFICE

RALPH L. LEE, OF DAYTON, OHIO, ASSIGNOR TO DELCO-LIGHT COMPANY, OF DAYTON, OHIO, A CORPORATION OF DELAWARE

ADJUSTABLE CASTER

Application filed August 6, 1923. Serial No. 655,916.

This invention relates to supporting devices which provide portability, such as casters and the like.

Among the objects of the present invention is to adjust an article supported by casters so that it may be either moved about on its casters or the casters locked against rotation, and the weight supported thereby transmitted to the floor directly through the caster wheels, the caster wheel shafts being relieved of this load.

Other and further objects and advantages of the present invention will be apparent from the following description, reference being had to the accompanying drawings wherein a preferred embodiment of one form of the present invention is clearly shown.

In the drawings:

Fig. 1 is a sectional view of a foot member supported by a caster and including the present invention, the caster wheel being free to rotate; and Fig. 2 is a view in elevation of the same, with a portion of the foot broken away and showing the caster wheel locked against rotation; and Fig. 3 is a top plan view of a washing machine provided with supporting devices of the present type.

Referring to the drawings, a foot member 20, which is preferably cast integrally with a leg 21, is provided with a hollow cup-shaped portion 22, and provides a bearing 23, and in vertical alignment therewith a tapped hole for receiving a screw 24 provided with a handle 25. The bearing 23 supports a caster stem 26 having a conical end surface 27 received by a conical cavity in the lower end of screw 24 which provides a step bearing.

A caster of the conventional type, comprises a wheel 28 having a slightly crowned periphery, and an axle shaft 29 which is journalled in parallel branch portions 30 of a yoke member 31. Yoke 31 is attached to stem 26 and is received within the cup-shaped portion 22. Stem 26 is provided with an angular groove 32 for receiving a resilient split ring 33 for preventing the stem 26 from sliding out of the bearing 23.

It will be apparent that movement of the screw 24 will provide relative endwise movement between the foot 20 and the step bearing. When the screw 24 is screwed into the foot 20, the foot will be lifted away from the wheel 28, thus permitting the wheel to rotate over the floor surface, with the load transmitted through the axle shaft 29. However, when the screw 24 is unscrewed from the foot 20, the foot will be lowered thereby causing the curved surface 34 provided by the cup-shaped portion 22 to engage the crowned periphery of wheel 28, as shown in Fig. 2. In this manner the load is transmitted from the foot 20 directly through the wheel 28 to the floor, and the axle shaft 29 is relieved of this load. The load resting on the wheel 28 prevents the same from rotating, and thus serves as a lock for wheel 28.

By removing the screw 24 from the foot 20, the caster may be driven downwardly, the chamfer 35 tending to compress the split ring 33 into the groove 32 so that the stem 26 may be removed from the bearing 23. A chamfer 36 is provided for compressing the split ring 33 when the stem is inserted in the bearing 23.

Where a plurality of devices of the present type are used for supporting an article, such as a washing machine 37 shown in Fig. 3, the feet of the washing machine may be adjusted varying degrees with respect to the caster wheels, in order to compensate for uneven floor surfaces or to level the machine. All the caster wheels may be locked against rotation to stabilize the machine and the load of the machine is transmitted directly through all of the caster wheels to the floor, taking the load off the caster wheel shafts, or for instance, the caster wheels 38 and 39, as shown in Fig. 3, may be locked against rotation for stabilizing the machine, and the wheels 40 and 41 may be adjusted varying degrees to compensate for uneven floor surfaces. These features are especially desirable when it is considered that a machine such as a washing machine is generally used in a basement where often times the floor surface is somewhat uneven. With the use of the present invention, the machine may be stabilized upon the floor surface and the shifting about incident to the use of the machine is substantially overcome by the locking of the caster wheels.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. Supporting mechanism comprising, in combination, an article to be supported including a foot member; a caster having a stem portion journalled in said foot member, said stem portion and foot member adapted to be relatively slidable; and means including a screw threaded into said foot member and in alignment with the caster stem and provided at its lower end with a step bearing portion for receiving the caster stem for producing relative endwise movement between the step bearing and the foot member.

2. Supporting mechanism comprising, in combination, an article to be supported including a foot member providing a bearing; a caster including a wheel, and a stem adapted to slidably fit into said bearing; means having threaded engagement with said foot member extending into said member, contacting with said stem and rotatable with respect thereto whereby to raise or lower said foot member with respect to said wheel.

3. Supporting mechanism comprising, in combination with a working machine, a number of casters in excess of three for supporting said machine upon a floor surface, each of said casters including a roller and having a stem portion journaled in the work machine and adapted to slide longitudinally therein, means for locking against rotation certain of said rollers to stabilize the machine, and for adjusting the other casters to compensate for uneven floor surfaces, said means comprising screws threaded into the working machine and adapted to engage said casters.

4. In combination with a work machine, a number of casters in excess of three for supporting the machine upon a floor surface, each of said casters including a roller, means associated with each caster for adjusting the height of the machine with respect to such caster while maintaining the roller thereof free to rotate, and means associated with certain of said casters for locking the roller thereof against rotation upon a predetermined lowering of the machine.

5. Apparatus of the class described, comprising in combination, an article to be supported including a foot member, a caster including a wheel and having a stem slidably and rotatably mounted in said foot member, means for adjusting the height of the foot member with respect to the caster including a screw threaded into the foot member in alignment with the stem and provided at its lower end with a bearing for the stem, and means for locking the caster wheel against rotation upon a predetermined lowering of the foot member.

In testimony whereof I hereto affix my signature.

RALPH L. LEE.